(12) United States Patent
Deffenbaugh et al.

(10) Patent No.: US 7,369,980 B2
(45) Date of Patent: May 6, 2008

(54) METHOD FOR CONSTRUCTING A GEOLOGIC MODEL OF A SUBSURFACE RESERVOIR

(75) Inventors: Max Deffenbaugh, Califon, NJ (US); Paul A. Dunn, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 10/586,373

(22) PCT Filed: Feb. 22, 2005

(86) PCT No.: PCT/US2005/005358

§ 371 (c)(1),
(2), (4) Date: Jul. 14, 2006

(87) PCT Pub. No.: WO2005/104003

PCT Pub. Date: Nov. 3, 2005

(65) Prior Publication Data

US 2007/0100593 A1 May 3, 2007

Related U.S. Application Data

(60) Provisional application No. 60/558,287, filed on Mar. 31, 2004.

(51) Int. Cl.
*G06G 7/48* (2006.01)
(52) U.S. Cl. ....................................................... 703/10
(58) Field of Classification Search .................. 703/10
See application file for complete search history.

(56) References Cited

U.S. PATENT DOCUMENTS 4,821,164 A    4/1989  Swanson ........................ 702/5
4,821,242 A *  4/1989  Hennington ................. 367/53
5,844,799 A   12/1998  Joseph et al. ................... 702/2
6,430,507 B1   8/2002  Jorgensen et al. ............. 702/6
6,674,689 B2   1/2004  Dunn et al. .................... 367/43

(Continued)

FOREIGN PATENT DOCUMENTS

WO     WO 03/003053        9/2003

(Continued)

OTHER PUBLICATIONS

Chris Paola, "Quantitative models of sedimentary basin filling", 2000, Sedimentology, vol. 47, Supplement 1, pp. 121-178.*

(Continued)

*Primary Examiner*—Paul Rodriguez
*Assistant Examiner*—Russ Guill
(74) *Attorney, Agent, or Firm*—ExxonMobil Upstream Research Company-Law Dept.

(57) ABSTRACT

The present invention is a method for constructing a geologic model of a subsurface reservoir which is a composite sedimentary body (30) composed of many smaller fundamental sedimentary bodies (32). In one embodiment, the fundamental sedimentary bodies (32) within the composite body (30) are specified by the properties of the flow which built them, including the flow properties that existed at the local inlet (36) of each fundamental body (32). The statistical distribution of these local inlet properties is characterized throughout the composite sedimentary body (30) using either outline forms of some of the fundamental sedimentary bodies (32) or a well penetration which samples the composite sedimentary body (30). The geologic model is constructed by placing an appropriate statistical distribution of the fundamental sedimentary bodies (32) into the outline form of the composite sedimentary body (30) so that the grain size distribution and/or other geologic properties are specified at each point within the composite sedimentary body (30).

26 Claims, 4 Drawing Sheets

U.S. PATENT DOCUMENTS

| | | |
|---|---|---|
| 6,823,266 B2 | 11/2004 | Czernuszenko et al. ...... 702/14 |
| 6,885,941 B2 | 4/2005 | Deffenbaugh et al. ......... 702/2 |
| 7,024,021 B2 | 4/2006 | Dunn et al. ................. 382/109 |
| 7,062,383 B2 | 6/2006 | Deffenbaugh et al. ......... 702/2 |
| 2003/0216897 A1* | 11/2003 | Endres et al. ................. 703/10 |

FOREIGN PATENT DOCUMENTS

| | | |
|---|---|---|
| WO | WO 2004/083896 | 3/2004 |
| WO | WO 2004/093521 | 4/2004 |
| WO | WO 2005/104003 | 11/2005 |
| WO | WO 2006/007466 | 1/2006 |
| WO | WO 2006/031383 | 3/2006 |
| WO | WO 2006/036389 | 4/2006 |

OTHER PUBLICATIONS

Hoyal et al.; "Sedimentation from Jets: A Depositional Model for Clastic Deposits of all Scales and Environments", May 11, 2003, AAPG Annual Convention, nine unnumbered pages.*

Van Wagoner et al.; "Energy Dissipation and the Fundamental Shape of Siliciclastic Sedimentary Bodies", May 14, 2003, Search and Discovery, Article #40080, nine unnumbered pages.*

Dunn et al.; "Hierarchical, Self-Affine Fluvial Sand Body Shapes from Ancient and Modern Settings", May 11, 2003, AAPG Annual Convention, eight unnumbered pages.*

Rudy Slingerland et al.; "Simulating Clastic Sedimentary Basins", 1994, Prentice Hall.*

EP Search Report No. 111303, Sep. 16, 2004.

PCT International Search Report, May 23, 2005.

Cuisiat, F et al. (1998) "Petroleum Reservoir Simulation Coupling Flow and Deformation", *SPE 50636*, pp. 63-72.

Fagherazzi, S. and Sun, Tao (2003) "Numerical Simulations of Transportational Cyclic Steps", *Computers & Geosciences*, v. 29, pp. 1143-1154.

Syvitski, J. and Daughney S. (1992) "Delta2: Delta Progradation and Basin Filling", *Computers & Geosciences*, v. 18, No. 7, pp. 839-897.

Syvitski, J. and Hutton, E. (2001) "2D SEDFLUX 1.0C: An Advanced Process-Response Numerical Model for the Fill of Marine Sedimentary Basins", *Computers & Geosciences*, v. 27, pp. 731-753.

* cited by examiner

US 7,369,980 B2

METHOD FOR CONSTRUCTING A GEOLOGIC MODEL OF A SUBSURFACE RESERVOIR

This application is the National Stage of International Application No. PCT/US2005/05358, filed Feb. 22, 2005, which claims the benefit of U.S. Provisional Patent Application No. 60/558,287, filed on Mar. 31, 2004.

FIELD OF THE INVENTION

This invention relates generally to the field of geophysical prospecting. More specifically, the invention is a method for constructing a geologic model specifying the detailed internal structure and grain size distribution within a composite sedimentary body based on a seismic image of the body.

BACKGROUND OF THE INVENTION

In the oil and gas industry, seismic prospecting techniques are used to aid in the search for and evaluation of subterranean hydrocarbon reservoirs. A seismic prospecting operation consists of three stages: data acquisition, data processing, and data interpretation. The success of the operation depends on satisfactory completion of all three stages.

In the data acquisition stage, a seismic source is used to generate an acoustic signal that propagates into the earth and is at least partially reflected by subsurface seismic reflectors. The reflected signals are detected and recorded by an array of seismic receivers located at or near the surface of the earth, in an overlying body of water, or at known depths in boreholes.

During the data processing stage, the recorded seismic signals are refined and enhanced using a variety of procedures that depend on the nature of the geologic structure being investigated and on the characteristics of the raw data. In general, the purpose of the data processing stage is to produce an image of the subsurface from the recorded seismic data for use during the data interpretation stage.

The purpose of the data interpretation stage is to determine information about the subsurface geology of the earth from the processed seismic data. The results of the data interpretation stage may be used to determine the general geologic structure of a subsurface region, or to locate potential hydrocarbon reservoirs, or to guide the development of a discovered reservoir.

Due to the limited resolution of seismic data, the conclusions which can be made after the data interpretation stage are generally limited to broad descriptions of the size and overall shape of subsurface reservoirs. The descriptions may for example provide an indication of the total volume of hydrocarbons which might be retained in such reservoirs. However, present technology does not allow the analyst to accurately determine the detailed internal structure of the reservoir from seismic data. Even when an exploration well has been drilled, present technology does not allow an analyst to accurately characterize detailed reservoir structure in locations other than in the most immediate region of any such well.

A commercial hydrocarbon reservoir is generally a "composite" sedimentary body, composed of a large number of smaller "fundamental" sand bodies, many of which are too small to be separately distinguished in a seismic image. Reservoir continuity, the communication (or lack thereof) between adjacent sand bodies, is commonly a primary factor controlling hydrocarbon production efficiency and ultimate recovery. There is a need to predict detailed internal structure of subsurface reservoirs using seismic data and without having to drill many exploration and delineation wells. Such a capability would facilitate estimation of hydrocarbon volume in place and production rates early in the hydrocarbon exploration and development process. Accordingly, this invention satisfies that need.

SUMMARY OF THE INVENTION

A method for predicting the properties of a composite sedimentary body is disclosed. The method comprises (a) determining the outline form of the composite body, (b) characterizing the properties of the fundamental bodies in the composite body, (c) generating the next fundamental body to be placed in the composite body outline, (d) placing the next fundamental body into the outline of the composite body, and (e) repeating steps (c) through (e) until the outline of the composite body is substantially full of fundamental bodies.

A second embodiment of a method for predicting the properties of a composite sedimentary body is disclosed. The method comprises (a) determining the outline form of the composite body, (b) determining at least part of the outline form of at least one fundamental body within the composite body, (c) determining the properties of at least one fundamental body within the composite body, (d) characterizing the fundamental body properties throughout the composite body, (e) generating the next fundamental body to be placed in the composite body outline, (f) placing the next fundamental body into the outline of the composite body, (g) repeating steps (e) through (g) until the outline of the composite body is substantially full of fundamental bodies.

A third embodiment of a method for predicting the properties of a composite sedimentary body is disclosed. The method comprises (a) determining the outline form of the composite body, (b) measuring the thickness and grain size distribution at one point in at least one fundamental body within the composite sedimentary body, (c) determining the properties of at least one fundamental body within the composite body from the point measurement of thickness and grain size distribution within the body, (d) characterizing the fundamental body properties throughout the composite body, (e) generating the next fundamental body to be placed in the composite body outline, (f) placing the next fundamental body into the outline of the composite body, (g) repeating steps (e) through (g) until the outline of the composite body is substantially full of fundamental bodies.

DETAILED DESCRIPTION

Figure 1:
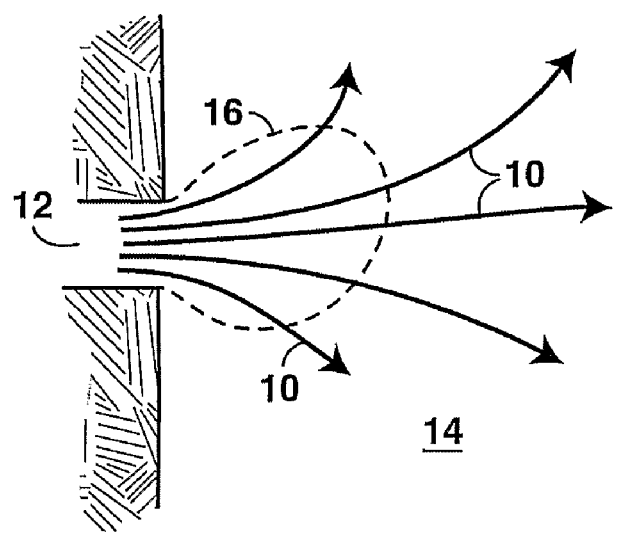
FIG. 1 depicts the plan view of a fluid flow which is beginning to create a fundamental body.

In the following detailed description, the invention will be described in connection with its preferred embodiments. However, to the extent that the following description is specific to a particular embodiment or a particular use of the invention, this is intended to be illustrative only. Accordingly, the invention is not limited to the specific embodiments described below, but rather, the invention includes all alternatives, modifications, and equivalents falling within the true scope of the appended claims.

The deposition of clastic sedimentary bodies typically begins with a flow of sediment-laden water from a confined channel, such as a river mouth, into an open region, such as a basin. Initially such flows expand freely and deposit sediment as the flow decelerates. Thereafter, as the deposited sediment grows in height, the deposit begins to obstruct the flow. Eventually, the deposit becomes sufficiently large that the flow is diverted around it. This terminates construction of the deposit (which we call a fundamental body) and results in a new path for the flow to an open region beyond or adjacent to it. The deposition process then repeats, and a second fundamental body in the system is created. More than one such fundamental sedimentary body may be actively built within the system at a time. Overall, the process produces a composite sedimentary body consisting of stacks of fundamental sedimentary bodies, which is a useful model for the structure of hydrocarbon reservoirs.

Fundamental bodies are defined as generally lobate sand bodies deposited during single flows or multiple flows where the locus of deposition has remained relatively stationary. A fundamental body may also be defined to include other elements associated with deposition of the sand, such as the structure and fill properties of the channel which supplied the sand to the deposit location, the capacity of the flow which built the fundamental body to erode into underlying sediment, and properties of adjacent fine-grained sediments that may be deposited prior to or subsequent to the deposition of the sand. Composite bodies are formed by aggregates of fundamental bodies and the interaction between elements of the fundamental bodies, such as the capacity of the flow which creates one body to erode underlying bodies.

The present invention is a method for constructing a geologic model of a subsurface hydrocarbon reservoir using seismic data and, if available, a minimum number of well penetrations. The geologic model thus created specifies the grain size distribution at all points internal to the reservoir and reflects the fact that the reservoir is a composite sedimentary body, made up of smaller fundamental sedimentary bodies. This geologic model is generated using the outline form of the composite body as determined from the seismic data as well as outlines, or partial outlines, of some of the fundamental bodies or available well penetrations.

In the present invention, the applicants recognized that if the locations and properties of the fundamental bodies that build a reservoir could be characterized, then an accurate geological model of the reservoir could be built. The applicants further recognized that due to the large number of fundamental bodies in a commercial hydrocarbon reservoir, it is not necessary to exactly specify the location and properties of every fundamental body. Rather, any realization of a geologic model having the correct statistical distribution of body properties and the correct trends of change in the distribution with position in the composite body can be used to adequately predict hydrocarbon volumes and production rates.

Each fundamental body has an associated local inlet, the point at which the flow building the body ceased to be confined and became free to expand, as at the end of a channel or a local expansion point within a channel. The applicants recognized that in certain embodiments of the invention, the properties of each fundamental body can be largely characterized by the properties of the depositing flow at the local inlet. The grain size trends within a fundamental body as well as the size and shape of the body are largely controlled by the flow properties at the inlet, such as the flow velocity, flow height, and volume fraction of suspended sediment in each sediment size class. Additionally, properties of the channel supplying the flow to the body and the degree to which the depositing flow erodes sediment within the channel and below the new body can be largely determined by the flow properties at the local inlet.

The applicants further recognized that the local inlet flow properties for a fundamental body may be considered to be a function of a single parameter. The single parameter may be taken to be the inlet flow velocity, the inlet flow height, the inlet Froude number, the inlet width, or any function of those four. When the single parameter is determined, the remaining inlet flow properties may be calculated. In some embodiments of the invention, the inlet flow velocity is selected as the single unknown or free parameter. Assumptions which allow all inlet properties to be determined from the inlet flow velocity are explained in greater detail in U.S. Pat. No. 6,885,941, but are summarized here: (a) that the size distribution of grains in the flow is known, (b) that the total volume of suspended sediment at the inlet is the maximum carrying capacity of the flow, so that the deposition rate is substantially zero at the inlet but becomes non-zero with an infinitesimal decrease in flow velocity, and (c) that empirical relations giving flow height and width as a function of flow velocity for flows in channels apply at the inlet location.

Figure 2:
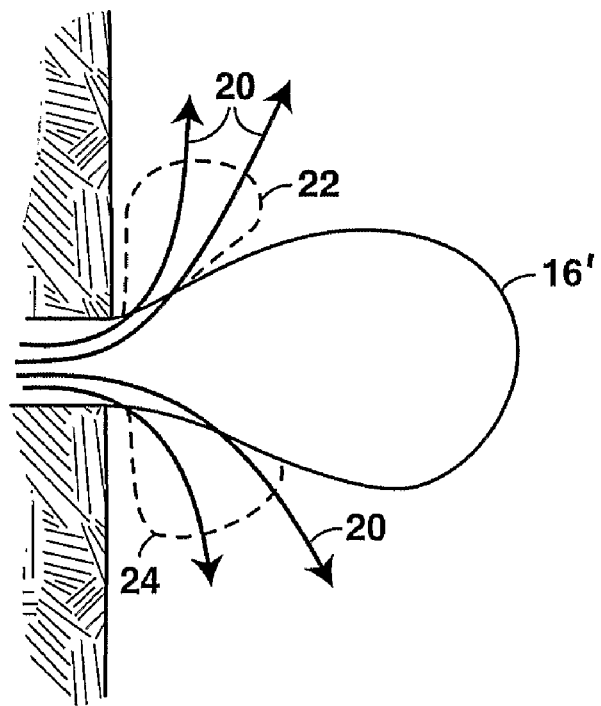
FIG. 2 depicts the plan view of a fluid flow which has completed building one fundamental body and begun building two more.
Figure 3:
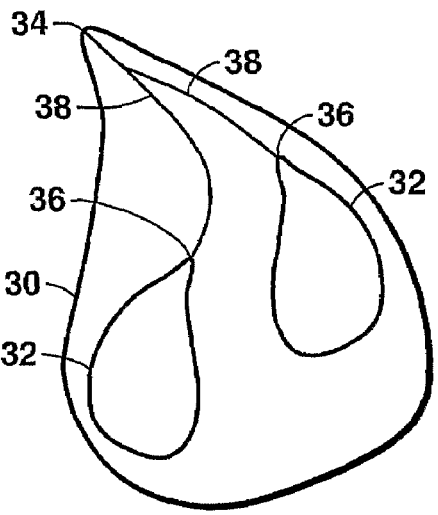
FIG. 3 depicts a plan view of a composite sedimentary body containing many fundamental bodies.

FIGS. 1, 2, and 3 depict the process of formation of a composite sedimentary body. FIG. 1 shows the earliest stage of deposition, where a sediment-rich flow 10 is emitted from an inlet 12 into an open region 14. As the flow expands and decelerates, it loses its capacity to carry sediment, and deposit 16, the first fundamental body, is formed beneath the flow.

FIG. 2 shows a later stage in development of the composite sedimentary body initiated in FIG. 1. In FIG. 2, the first fundamental body, 16 from FIG. 1, has become larger and is labeled 16. Fundamental body 16 is so large that it now diverts the flow 20. Body 16 is no longer building, but the diverted flow is now creating two new fundamental bodies, 22 and 24.

FIG. 3 shows a much later stage in the development of the composite sedimentary body begun in FIGS. 1 and 2. The mapview outline of the composite sedimentary body 30 and the mapview outlines of two smaller fundamental sedimentary bodies 32 within the composite are shown. The inlet of the composite body 34 and the local inlets of the fundamental bodies 36 are also indicated. Channels, 38, bring the flow from the inlet of the composite body to the local inlets of the fundamental bodies.

Figure 4:
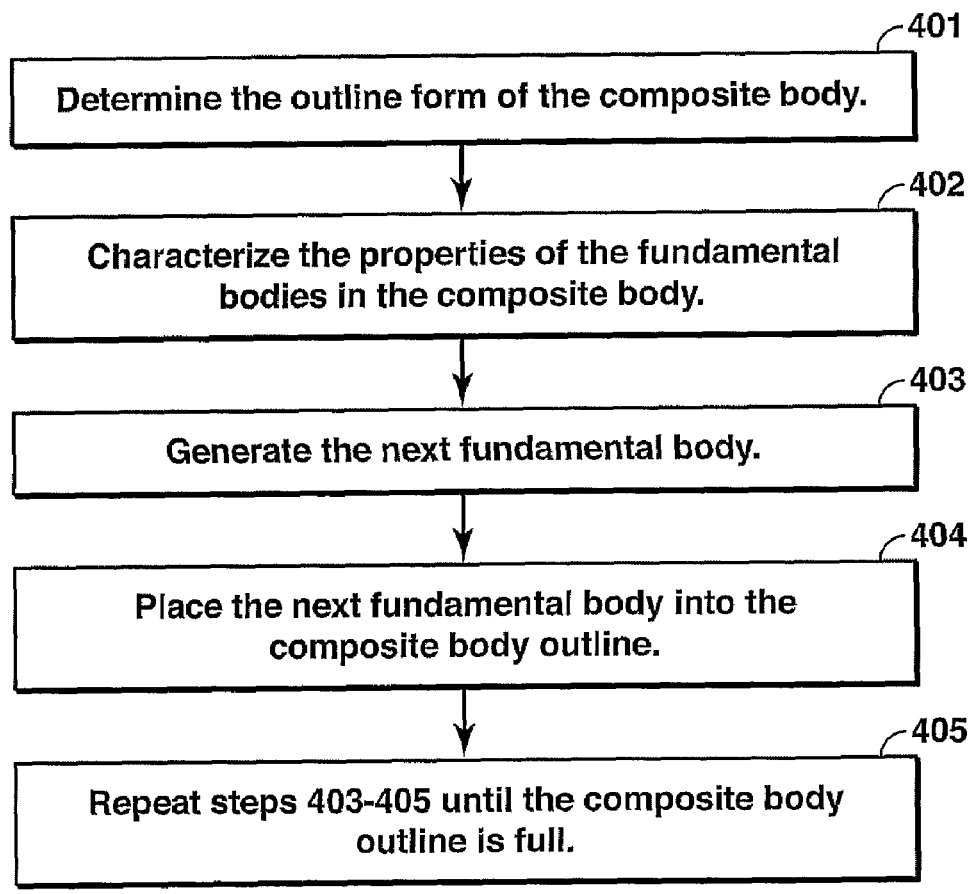
FIG. 4 is a flow chart of a first embodiment of the invention.

A first embodiment of the present invention will now be described, as shown in FIG. 4. The first step (step 401) is to determine the outline form of the composite body. The second step (step 402) is to characterize the properties of the fundamental bodies in the composite body. The third step (step 403) is to generate the next fundamental body to be placed in the composite body outline. The fourth step (step 404) is to place the fundamental body into the composite body outline. The fifth step (step 405) is to repeat steps 403 thru 405 until the composite body outline is substantially full of fundamental bodies. The properties of the fundamental bodies include the outline form of the body, the grain size distribution at each point within the body, and properties of the flow field that built the body such as the flow velocity, flow height, flow duration, and suspended sediment volume fractions for each grain size range at each point in the depositing flow. The fundamental body properties may also include the size, shape, and nature of finer sediment fractions that are deposited before or after the main sandy portion of the body, the erosional potential of the flow that built the body, and the geometry and fill properties of the channel that conducted the depositing flow from the composite body inlet to the local inlet of the fundamental body.

Step 401: Determine the outline form of the composite body. In one embodiment this is accomplished by identifying stratigraphic surfaces of the same order that bound, above and below, the composite body. Preferably, the stratigraphic surfaces extend to the edges of the composite body and close at the edges, though this is not a requirement of the method and partial outlines of composite bodies can be used. Methods for identifying stratigraphic surfaces in three-dimensional seismic volumes are familiar to persons of ordinary skill in the art, who will also recognize other equivalent methods for identifying or inferring the outline form of composite bodies. Such other methods include interpretation of two-dimensional seismic lines, other remote imaging techniques, correlating well logs, and spatially correlated outcrop observations. These other methods are also within the scope of this invention.

Step 402: Characterize the properties of the fundamental bodies in the composite body. In one embodiment, this step involves characterizing trends in the local inlet properties of the fundamental bodies throughout the composite body and relating the local inlet properties to all other properties of the fundamental bodies. In one embodiment, these trends in local inlet properties can be characterized by determining (a) the statistical distribution of local inlet properties at a point within the composite body and (b) how this statistical distribution changes with local inlet position throughout the composite body. The inlet properties characterized in this step would be: the flow velocity at the inlet, the flow height at the inlet, volume fraction of the flow at the inlet composed of grains within each grain size range, and the inlet width.

In U.S. Pat. No. 6,885,941, assumptions are made about relationships between inlet flow properties. In one embodiment, flow velocity becomes the only independent variable in defining the local inlet properties. Thus, in that embodiment, characterizing the local inlet properties throughout the composite body can be accomplished by simply characterizing the local inlet flow velocities throughout the composite body. Typically, the inlet flow velocity trend would be one of exponential decay in local inlet velocity with interpreted downstream distance from the composite body inlet and the probability distribution would be assumed to be log-normal around the peak likelihood specified by the trend. This trend and probability distribution in local inlet velocity is then fully described by three parameters: the most likely local inlet velocity at a point, the characteristic length of the exponential decay in most likely local inlet velocity, and the standard deviation (on a logarithmic scale) of the log-normal distribution of local inlet velocities around the most likely value. Methods for fitting this three-parameter model to a set of point determinations of local inlet velocity are familiar to persons of ordinary skill in the art. One such method is to fit a straight line to the plot of the natural logarithm of velocity versus distance from the composite body inlet. Once the line is fit, the three model parameters can be determined as follows: the required velocity at a point can be the velocity at any point on the line, the characteristic length of the exponential decay is the negative inverse of the slope of the line, and the standard deviation of the logarithm of velocity is the standard deviation of the measured points around the line.

The estimation of parameters of a model describing the variation of inlet properties within the system requires actual estimates of inlet properties in at least one location within the system. Persons of ordinary skill the in art, with the benefit of the disclosures in U.S. Pat. No. 6,885,941, and PCT Patent Publication Nos. WO2004/093521 and WO2004/083896 will recognize a variety of methods that could be used to provide inlet properties for particular sand bodies identified in seismic data or by well penetrations. These methods are intended to be within the scope of this invention.

Step 403: Generate the next fundamental body to place in the composite body outline. In one embodiment, bodies observed in seismic are generated first (by order of proximity to the system inlet), followed by bodies detected in wells (working from the bottom of the well up to the top), followed by enough unobserved bodies to substantially fill the composite body outline. To generate a fundamental body, the inlet flow velocity must be established. For bodies observed in seismic or in wells, the inlet flow velocity is already determined either from the seismic outline of the body or from the well penetration. For unobserved bodies, the inlet flow velocity is chosen at random, based on the probability distribution for inlet velocity at the approximate location of the new fundamental body inlet. For the first unobserved fundamental body, this approximate location is assumed to be the inlet of the composite sedimentary body. For subsequent unobserved fundamental bodies, the approximate location is assumed to be the inlet location for the previously placed fundamental body. Once the inlet velocity for the new fundamental body is established, the other inlet flow properties for the new fundamental body may be determined as described in step 402.

Once the inlet flow properties for the new fundamental body have been established, the fundamental body properties are determined. Typically, the fundamental bodies are calculated by numerical simulation of the fluid flow which deposits them, using the local inlet properties as boundary conditions. A first embodiment for making this numerical simulation is described in co-pending PCT Patent Publication No. WO2005/104003, where time-varying vertically-averaged equations for conservation of flow momentum, flow volume, and sediment volume are solved numerically to determine the evolution of the deposit and its internal gain size distribution through time. The simulation progresses until the body becomes large enough to substantially divert the flow that forms it. A second embodiment for making the numerical simulation is described in U.S. Pat. No. 6,885,941, and is generally preferred over the first embodiment because it is computationally faster, though less accurate. In this second embodiment, vertically averaged equations are also used, but to calculate a steady-state flow from the inlet flow properties, assuming flat topography below the flow. This flow is an associated deposition rate at each mapview location and is assumed to persist in steady state until the body has built to a specified maximum height which is also a function of the inlet flow properties. Persons of ordinary skill in the art will recognize other methods for calculating properties of a fundamental body once the inlet flow properties are determined, including other numerical simulation techniques. These methods are within the scope of this invention.

In many systems, when the flow velocity drops to near zero, very fine-grained material rains down, creating shale drapes of large lateral extent. These can create barriers to hydrocarbon flow in subsurface reservoirs. The thickness and extent of the associated shale drape can be calculated for each fundamental body and is regarded as a property of the fundamental body. In one embodiment, the approximate total volume of shale in the composite body is determined from seismic data using seismic attribute techniques familiar to persons of ordinary skill in the art. The appropriate volume of shale associated with each fundamental body is then calculated by dividing the total volume of shale detected in the composite body by the approximate number of fundamental bodies that will be required to fill the composite body. The thickness for each shale drape is the volume of shale in the drape divided by the lateral area of the drape. Alternatively, a spatially-varying thickness profile for each shale drape may be assumed which is consistent with the total volume of shale and the number of fundamental bodies in the composite body. The size and shape of the associated shale drape is recorded as a property of the fundamental body.

Underlying sediment can be eroded by the flow fields which deposit fundamental bodies. Of particular importance for characterizing reservoir permeability is the degree to which the shale drapes are penetrated by erosional scour. To approximately account for this effect, the flow field and flow duration associated with the deposition of each fundamental body is recorded as a property of the body. This information will be used later when the fundamental body is placed into the composite body outline to determine the extent to which the new fundamental body will erode underlying sediments.

Underlying sediment can also be eroded and new sediment deposited in association with the channel that brings the sediment from the inlet of the composite body to the local inlet of the fundamental body. In one embodiment, the properties of the flow in the channel can be assumed to be the same as the properties of the flow at the inlet of the fundamental body and the channel width may be assumed to equal the inlet width. All such channel properties that are derived from the inlet flow properties are recorded as a property of the fundamental body.

The fundamental body properties, including the associated shale drape, erosional flow field, and channel properties, may optionally be pre-calculated for the full range of inlet flow properties and stored for reference in computer memory to reduce the computational time required in application of the inventive method.

Step 404: Place the fundamental body into the composite body outline. In one embodiment, this step involves several parts: (a) the location is chosen for the fundamental body; (b) the flow field associated with the fundamental body is used to determine the extent to which underlying sediment should be removed; (c) the fundamental body is placed into the composite body outline; (d) a channel is cut through the composite body model from the fundamental body inlet to the composite body inlet. (e) the shale drape associated with the body is placed over the fundamental body within the composite body outline. These parts are described in greater detail below.

In one embodiment, the location of the fundamental body is chosen as described here. For bodies observed in seismic, the location is already determined. For bodies observed in wells, the location of the inlet is constrained by the requirement that the appropriate thickness contour of the deposit intersect the well. The primary (downstream) axis of the fundamental body is constrained to lie on a radial line from the system inlet. Subject to these constraints, the local inlet is placed as close as possible to the composite body inlet without causing the composite body model to exceed the observed thickness of the composite body by more than a prescribed percentage at any location—the prescribed percentage is typically 25% of the fundamental body thickness at the same location. If the location chosen for the fundamental body is far from the approximate location used in step 403 to determine the inlet properties, step 403 may be repeated using the chosen location as the new approximate location for the body.

Next, the flow field associated with the fundamental body is used to determine the extent to which underlying sediment is removed by erosional scour. A variety of empirical relationships between flow properties and erosion have been published and are all within the scope of this invention. The preferred embodiment is the erosion treatment in PCT Patent Publication No. WO2005/104003. The appropriate net erosion rate may be calculated at each point below the flow field, and sediment removed from the composite body model at each point to a depth equal to the erosion rate multiplied by the flow duration.

Next, the fundamental body is placed into the composite body model. Typically, this is accomplished by adding a new layer of cells to the composite body model, where the thickness and internal grain size distribution in each cell are the thickness and internal grain size distribution of the fundamental body at each mapview point.

Next, a channel is cut from the inlet of the composite body to the inlet of the fundamental body. In one embodiment, the channel is assumed to be of rectangular aspect, having a depth equal to the inlet flow height and a width equal to the inlet width. The sediment removed by this incision is then uniformly mixed and redistributed to fill the volume of the incision. Optionally, the channel cut could be refilled with sediment having other properties if those properties are known. Channels incised based on different assumptions about the cross-sectional shape of the channel and mapview path it follows from the composite body inlet to the fundamental body inlet are also within the scope of this invention.

Finally, the shale drape associated with the fundamental body is placed into the composite body model. Typically, this is accomplished by adding a new layer of cells to the composite body model, where the thickness and internal grain size distribution in each cell are the thickness and internal grain size distribution of the shale drape at each mapview point.

Step 405: Repeat steps 403 through 405 until the composite body outline is substantially filled with fundamental bodies.

Figure 5:
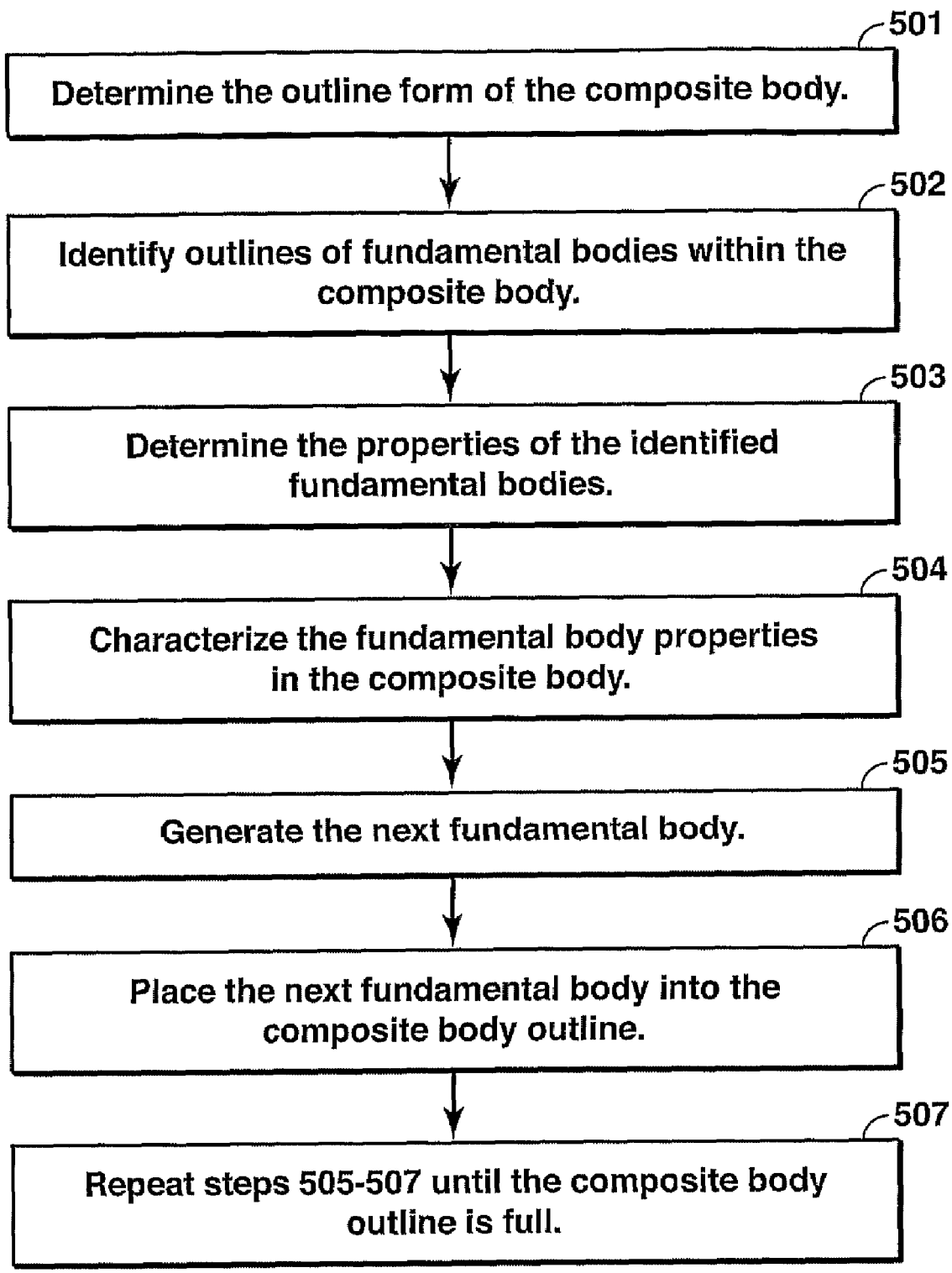
FIG. 5 is a flow chart of a second embodiment of the invention.

A second embodiment of the present invention will now be described as shown in FIG. 5. The first step (step 501) is to determine the outline form of the composite body. The second step (step 502) is to identify at least partial outline forms of all detectable fundamental bodies within the composite body. The third step (step 503) is to determine properties of the fundamental bodies. The fourth step (step 504) is to characterize the variability of fundamental body properties in the composite body. The fifth step (step 505) is generate the next fundamental body. The sixth step (step 506) is to place the next fundamental body into the outline form of the composite body. The seventh step (step 507) is to repeat steps 505-507 until the outline form of the composite body is substantially full of fundamental bodies.

Step 501: This step is the same as step 401 in FIG. 4.

Step 502: Identify at least part of the mapview outline of at least one fundamental body within the composite body. This identification is typically made in the same three-dimensional seismic volume used to identify the composite body outline. The method of picking these smaller units is typically based on contours of seismic amplitude, but persons of ordinary skill in the art will recognize other methods for picking stratigraphic units near the resolution limits of seismic data. Automated tools have been described to assist in this process, for example, in U.S. Pat. No. 6,674,689. Interpreted lines of three-dimensional seismic data, other remote imaging techniques, correlating well logs, and spatially correlated outcrop observations could also be used to identify outlines of fundamental bodies within the composite body. These other methods are also within the scope of this invention.

Step 503: Determine the properties for the observed fundamental bodies. One method is specified in U.S. Pat. No. 6,885.941. In this method, the seismic interpreter provides general paleocurrent directions sufficient to identify a local inlet point and down-stream end point for each identified seismic body. The method then utilizes constraints from fluid mechanics to relate a mapview contour of constant deposit thickness to the inlet properties of the flow that built the deposit.

Step 504: Characterize the trend in the properties of the fundamental bodies throughout the composite body. In one embodiment, this step involves characterizing the inlet flow velocity trend in the fundamental bodies throughout the composite body and relating the flow velocity to the other local inlet properties and all other properties of the fundamental bodies. As described in step 402, the inlet flow velocity trend is typically one of exponential decay with interpreted downstream distance from the composite body inlet, and the probability distribution around this trend could be log-normal around the peak likelihood specified by the trend. This trend and probability distribution in local inlet velocity is then fully described by three parameters: the local inlet velocity at a point, the characteristic length of the exponential decay, and the standard deviation (on a logarithmic scale) of the log-normal distribution. These parameters may be estimated from the local inlet velocities determined for the identified fundamental bodies in step 503.

Step 505: This step is the same as step 403 in FIG. 4.

Step 506: This step is the same as step 404 in FIG. 4.

Step 507: Repeat steps 505-507 until the composite body outline is substantially filled with fundamental bodies.

Figure 6:
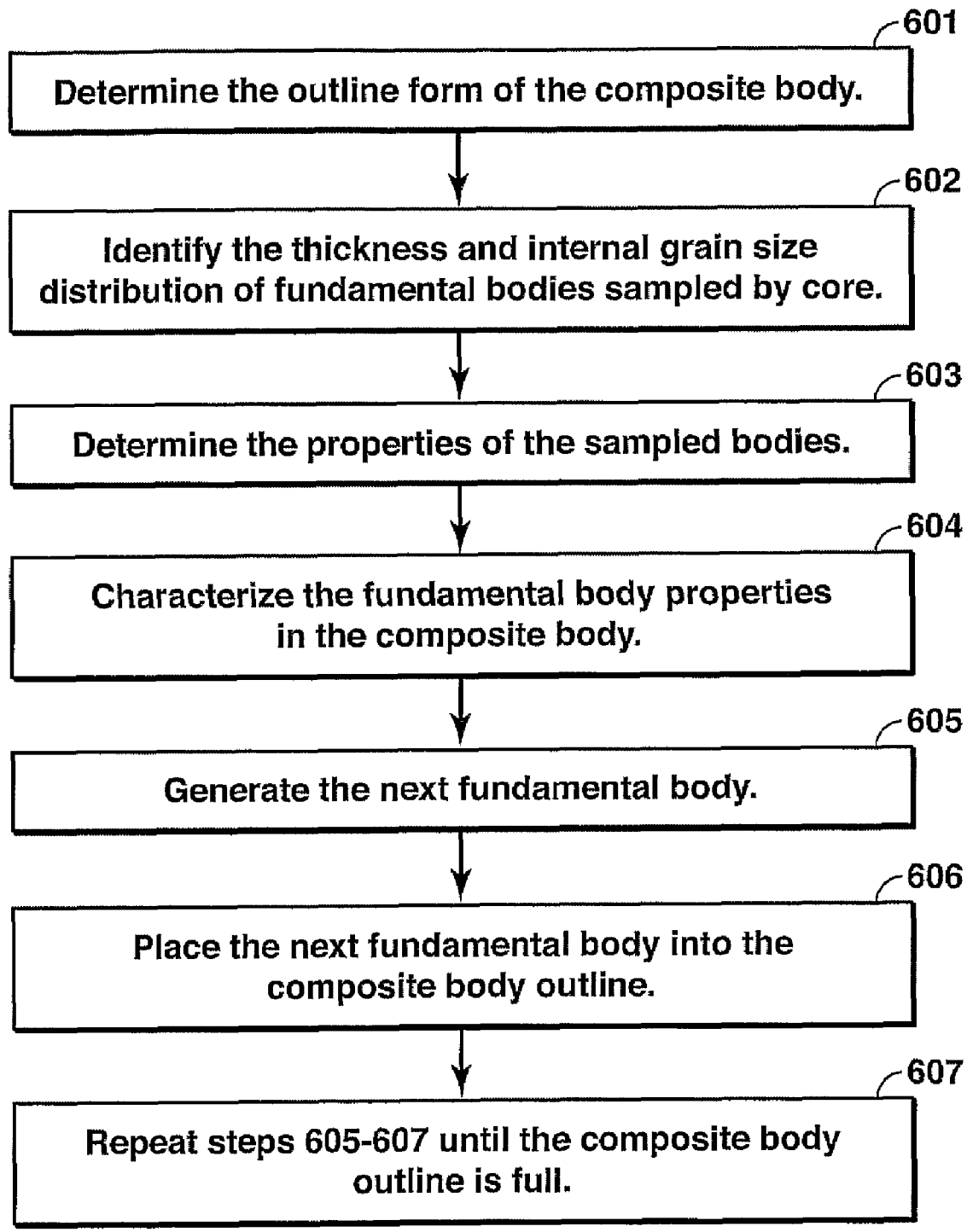
FIG. 6 is a flow chart of a third embodiment of the invention.

A third embodiment of the present invention will now be described as shown in FIG. 6. The first step (step 601) is to determine the outline form of the composite body. The second step (step 602) is to identify the thickness and grain size distribution of at least one fundamental body in at least one core that samples sedimentary bodies within the system. The third step (step 603) is to determine the properties of the sampled fundamental bodies. The fourth step (step 604) is to characterize the fundamental body properties in the composite body. The fifth step (step 605) is to generate the next fundamental body. The sixth step (step 606) is to place the fundamental body into the outline form of the composite body. The seventh step (step 607) is to repeat steps 605-607 until the outline form of the composite body is substantially full of sedimentary bodies.

Step 601: This step is the same as step 401 in FIG. 4.

Step 602: Measure the thickness and grain size distribution for at least one fundamental body penetrated by a core sampling the system. Ideally, the core should penetrate the composite body itself, but sometimes the lack of nearby cores may necessitate using cores that merely penetrate the same depositional system or an analogous system.

Step 603: Determine the properties of the sampled fundamental bodies. In one embodiment this involves determining the local inlet conditions associated with the sampled fundamental bodies. One method for making this determination is described in PCT Patent Publication No. WO2004/093521, wherein the method involves (a) estimating flow properties at the location where the well penetrates each body, (b) extrapolating these flow properties back to the inlet location (identified as the point where the flow properties become consistent with flow in a channel), and (c) adjusting the initial flow property estimate until the extrapolated inlet flow properties are consistent with the extrapolated maximum height of the body. Applying this method to sand bodies that the well penetrates within the system gives inlet properties for these bodies.

Step 604: Characterize the fundamental body properties throughout the composite body. In one embodiment, this is accomplished by inlet flow velocity trend for the fundamental bodies throughout the composite body, and relating the flow velocity to the other local inlet properties and all other properties of the fundamental bodies. As described in step 402, the inlet flow velocity trend is typically one of exponential decay with interpreted downstream distance from the system inlet, and the probability distribution could be log-normal around the peak likelihood specified by the trend. This trend and probability distribution in local inlet velocity is then fully described by three parameters: the local inlet velocity at a point, the characteristic length of the exponential decay, and the standard deviation (on a logarithmic scale) of the log-normal distribution.

Local inlet properties were calculated in step 603 for bodies in the vicinity of the well. If only one well is available, then it may not provide information about the trend of those properties throughout the system. One method for determining the trend in inlet properties throughout the system uses the relationship between system thickness and vertically averaged grain size distribution, as described in PCT Patent Publication No. WO2004/083896. The vertically averaged grain size distribution at a point in the system will be approximately equal to the average thickness-weighted grain size distribution in the typical sand body at that location. To determine the inlet properties of the typical sand body at a given location, the following method may be used: (a) determine the vertically averaged grain size distribution at that location from the composite body thickness at that location. This determination can be made using the thickness and vertically averaged grain size at a different location where core is available together with the method of PCT Patent Publication No. WO2004/083896; (b) estimate the typical inlet velocity at that location; (c) calculate the other inlet properties based on the inlet velocity estimate; (d) simulate the sand body form and grain size distribution associated with the estimated inlet velocity; (e) calculate the average thickness-weighted grain size distribution within the simulated sand body; (f) refine the inlet velocity estimate in step (b) until the average thickness-weighted grain size distribution within the body is substantially equal to the vertically averaged grain size distribution at that location as predicted in step (a). This method provides the inlet property trends directly from the shape of the composite body, without the need for observations of fundamental bodies at a second mapview location.

Step 605: Step 605 is the same as step 403 in FIG. 4.

Step 606: Step 606 is the same as step 404 in FIG. 4.

Step 607: repeat steps 605-606 until the composite body outline is substantially full with simulated fundamental bodies.

We claim:

1. A method for constructing a geologic model of a hydrocarbon reservoir in a subsurface region and using the model to plan development or predict hydrocarbon volumes or production rates of the reservoir, comprising:

(a) determining an outline of a composite sedimentary body in the subsurface region from stratigraphic surfaces identified from seismic data, other subsurface imaging techniques, well logs or outcrop observations, said composite sedimentary body comprising a plurality of fundamental bodies created by flowing, sediment-laden water;

(b) characterizing properties of fundamental bodies in the composite sedimentary body;

(c) simulating generation of a fundamental body based on the characterized properties of fundamental bodies, wherein the fundamental body grows until it becomes large enough to divert the sediment-laden flow that creates it;

(d) placing the fundamental body into the outline of the composite sedimentary body;

(e) repeating steps (c) through (d) one or more times until the outline of the composite sedimentary body contains a plurality of fundamental bodies;

(f) constructing a geologic model of a hydrocarbon reservoir in the subsurface region, said model being based on the fundamental bodies from the preceding step; and (g) using the geologic model to plan development or predict hydrocarbon volumes or production rates of the reservoir.

2. The method of claim 1, wherein the properties of the fundamental bodies are characterized by a method chosen from the group consisting of: determining local inlet properties of flows which built the fundamental bodies, determining trends in the local inlet properties of the flows which built the fundamental bodies, determining statistical distributions of the local inlet properties of the flows which built the fundamental bodies, and any combination thereof.

3. The method of claim 2, wherein the local inlet properties are chosen from the group consisting of: flow velocity at an inlet, flow height at the inlet, suspended sediment volume within at least one grain size range at the inlet, inlet width, flow duration, inlet location, order in which the inlet is active relative to local inlets of other fundamental bodies, and any combination thereof.

4. The method of claim 2, wherein a possible range of the inlet flow properties is constrained by mathematical relationships between at least two of the local inlet properties.

5. The method of claim 1, wherein the properties of the fundamental bodies comprise at least one member of the group: shapes of the fundamental bodies, sizes of the fundamental bodies, heights of the fundamental bodies, grain size distributions in at least one point within the fundamental bodies, bedding types in at least one point within the fundamental bodies, degrees of erosional scour below the fundamental bodies associated with deposition of the fundamental bodies, shape of the channel feeding sediment to an inlet, size of the channel feeding sediment to the inlet, degree of erosional scour caused by a channel feeding sediment to the inlet, at least one property of sediment which forms the channel feeding sediment to the inlet, at least one property of sediment which subsequently fills the channel feeding sediment to the inlet, and any combination thereof.

6. The method of claim 1, wherein the outline of the composite sedimentary body is determined from seismic data.

7. The method of claim 1, wherein the properties of at least one of the fundamental bodies are determined using grain size and body thickness measurements from a well sample.

8. The method of claim 1, wherein the properties of at least one of the fundamental bodies are determined by using at least part of an outline form of an identified fundamental body.

9. The method of claim 1, wherein characterizing the properties of the fundamental bodies in the composite sedimentary body includes at least determining properties of fundamental bodies from the outline of the composite sedimentary body.

10. The method of claim 1, wherein steps (c)-(d) are repeated until another fundamental body will not fit inside the outline.

11. The method of claim 1, wherein steps (c)-(d) are repeated until the outline of the composite sedimentary body is substantially full of fundamental bodies.

12. The method of claim 1, wherein the fundamental bodies are simulated in three dimensions and the geologic model is a three-dimensional model.

13. A method for constructing a geologic model of a hydrocarbon reservoir in a subsurface region and using the model to plan development or predict hydrocarbon volumes or production rates of the reservoir, comprising:

(a) determining an outline of a composite sedimentary body in the subsurface region;

(b) determining an outline of at least one identified fundamental body within a composite sedimentary body;

(c) determining properties of at least one identified fundamental body within the composite sedimentary body;

(d) characterizing the properties of fundamental bodies in the composite sedimentary body;

(e) simulating generation of another fundamental body to be placed in the outline of the composite sedimentary body;

(f) placing the other fundamental body into the outline of the composite sedimentary body;

(g) repeating steps (e) through (f) until the outline of the composite sedimentary body contains a plurality of fundamental bodies;

(h) constructing a geologic model of a hydrocarbon reservoir in the subsurface region, said model being based on the fundamental bodies from the preceding step; and (i) using the geologic model to plan development or predict hydrocarbon volumes or production rates from the reservoir.

14. The method of claim 13, wherein the properties of the fundamental bodies are characterized by a method selected from the group consisting of: determining local inlet properties of flows which built the fundamental bodies, determining trends in the local inlet properties of flows which built the fundamental bodies, determining statistical distributions of the local inlet properties of flows which built the fundamental bodies, and any combination thereof.

15. The method of claim 14, wherein the local inlet properties are chosen from the group consisting of: flow velocity at an inlet, flow height at the inlet, suspended sediment volume within at least one grain size range at the inlet, inlet width, flow duration, inlet location, order in which the inlet is active relative to local inlets of other fundamental bodies, and any combination thereof.

16. The method of claim 14, wherein a possible range of the local inlet properties is constrained by mathematical relationships between at least two of the local inlet properties.

17. The method of claim 13, wherein the properties of the fundamental bodies comprise at least one member of the group: shapes of the fundamental bodies, sizes of the fundamental bodies, heights of the fundamental bodies, grain size distributions in at least one point within the fundamental bodies, bedding types in at least one point within the fundamental bodies, degrees of erosional scour below the fundamental bodies associated with deposition of the fundamental bodies, shape of a channel feeding sediment to an inlet, size of the channel feeding sediment to the inlet, degree of erosional scour caused by the channel feeding sediment to the inlet, at least one property of sediment which forms the channel feeding sediment to the inlet, at least one property of sediment which subsequently fills the channel feeding sediment to the inlet, and any combination thereof.

18. The method of claim 13, wherein the outline of the composite sedimentary body is determined from seismic data.

19. The method of claim 13, wherein the outline of at least one identified fundamental body is determined from seismic data.

20. A method for constructing a geologic model of a hydrocarbon reservoir in a subsurface region and using the model to plan development or predict hydrocarbon volumes or production rates of the reservoir, comprising:
   (a) determining an outline of a composite sedimentary body in the subsurface region;
   (b) measuring thickness and grain size distribution at one point in at least one identified fundamental body within the outline of the composite sedimentary body;
   (c) determining properties of the at least one identified fundamental body within the composite sedimentary body from a point measurement of thickness and grain size distribution within the at least one identified fundamental body;
   (d) characterizing properties of fundamental bodies in the composite sedimentary body;
   (e) simulating generation of another fundamental body to be placed in the outline of the composite sedimentary body;
   (f) placing the other fundamental body into the outline of the composite sedimentary body;
   (g) repeating steps (e) through (f) until the outline of the composite sedimentary body contains a plurality of fundamental bodies;
   (h) constructing a geologic model of a hydrocarbon reservoir in the subsurface region, said model being based on the plurality of fundamental bodies from the preceding step; and
   (i) using the geologic model to plan development or predict hydrocarbon volumes or production rates of the reservoir.

21. The method of claim 20, wherein the properties of the fundamental bodies are characterized by a method selected from the group consisting of: determining local inlet properties of flows which built the fundamental bodies, determining trends in the local inlet properties of the flows which built the fundamental bodies, determining statistical distributions of the local inlet properties of the flows which built the fundamental bodies, and any combination thereof.

22. The method of claim 21, wherein the local inlet properties are chosen from the group consisting of: flow velocity at an inlet, flow height at the inlet, suspended sediment volume within at least one grain size range, inlet width, flow duration, inlet location, order in which the inlet is active relative to local inlets of other fundamental bodies, and any combination thereof.

23. The method of claim 21, wherein a possible range of the local inlet properties is constrained by mathematical relationships between at least two of the local inlet properties.

24. The method of claim 20, wherein the properties of the fundamental bodies—comprise at least one member of the group: shapes of the fundamental bodies, sizes of the fundamental bodies, heights of the fundamental bodies, grain size distributions in at least one point within the fundamental bodies, bedding types in at least one point within the fundamental bodies, degrees of erosional scour below the fundamental bodies associated with deposition of the fundamental bodies, shapes of the channel feeding sediment to a inlet, size of the channel feeding sediment to the inlet, degree of erosional scour caused by the channel feeding sediment to the inlet, at least one property of sediment which forms the channel feeding sediment to the inlet, at least one of sediment which subsequently fills the channel feeding sediment to the inlet, and any combination thereof.

25. The method of claim 20, wherein the outline of the composite sedimentary body is determined from seismic data.

26. The method of claim 20, wherein the properties of the fundamental bodies are determined by using at least the outline of the composite sedimentary body.

* * * * *